United States Patent [19]
Petit

[11] Patent Number: 6,115,657
[45] Date of Patent: *Sep. 5, 2000

[54] CONTROL DEVICE WITH A SINGLE MANUAL CONTROL MEMBER FOR A MOTOR VEHICLE INSTALLATION, IN PARTICULAR A HEATING VENTILATING AND/OR AIR CONDITIONING INSTALLATION

[75] Inventor: Thierry Petit, Montigny le Bretonneux, France

[73] Assignee: Valeo Climatisation, La Verriere, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/033,786

[22] Filed: Mar. 3, 1998

[30] Foreign Application Priority Data

Mar. 3, 1997 [FR] France ................................. 97 02500

[51] Int. Cl.$^7$ ................... G06F 7/00; B60H 1/32; B60H 1/00
[52] U.S. Cl. ................ 701/36; 62/239; 62/323.1; 237/5
[58] Field of Search ................ 701/36; 364/528.11; 237/5, 12.3 R, 12.4; 62/239, 323.1; 236/1 E

[56] References Cited

U.S. PATENT DOCUMENTS 4,486,837  12/1984  Kojima et al. ..................... 701/36
5,555,502   9/1996  Open ............................. 364/424.05

FOREIGN PATENT DOCUMENTS

| 1 447 259 | 11/1966 | France . |
| 37 37 087 | 5/1989 | Germany . |
| 40 41 193 A1 | 7/1992 | Germany . |
| 41 35 363 | 4/1993 | Germany . |
| 41 35 363 A1 | 4/1993 | Germany . |
| 296 04 717 U1 | 7/1996 | Germany . |
| 195 44 467 C1 | 11/1996 | Germany . |

OTHER PUBLICATIONS

French Search Report dated Dec. 26, 1997.

*Primary Examiner*—William A. Cuchlinski, Jr.
*Assistant Examiner*—Yonel Beaulieu
*Attorney, Agent, or Firm*—Morgan & Finnegan LLP

[57] ABSTRACT

A motor vehicle heating, ventilating and/or air conditioning installation has air distribution, air mass flow and air temperature functions, each of which is adjustable between several different states. Control of these functions is exercised, by a control device which includes an electronic control module, in response to operation of a single manual control knob by the driver. The control knob acts on the control module when put into a position selected among several positions, each corresponding to one of the functions of the installation. The control member is displaced by tilting within its selected position, so as to act on the control member in such a way as to modify the state of the selected function.

17 Claims, 4 Drawing Sheets

CONTROL DEVICE WITH A SINGLE MANUAL CONTROL MEMBER FOR A MOTOR VEHICLE INSTALLATION, IN PARTICULAR A HEATING VENTILATING AND/OR AIR CONDITIONING INSTALLATION

FIELD OF THE INVENTION

This invention relates to devices for controlling on-board installations in motor vehicles, in particular installations for heating, ventilating and/or air conditioning purposes. Such a control device is typically in the form of a control unit which includes a control panel; and the invention is concerned more particularly with such control panels that include a control device having an electronic control module which manages at least three different functions of the installation, with each of these functions being adjustable, such adjustment involving the selection of at least two different states (or settings) of the function concerned.

In this Application, the term "function" is to be understood in the sense of, for example, management of temperature in the cabin of the vehicle, or of the mass flow of air delivered by the installation into the cabin for various purposes. Within the context of any given function, the term "state" is to be understood to mean an operating mode selected among a plurality of possible operating modes. Thus for example when the function is that of temperature control, one state of this function is 20° C., another state being 25° C.

BACKGROUND OF THE INVENTION

In known heating and/or air conditioning installations for motor vehicles, in order to enable an occupant of a vehicle to set the atmospheric parameters required in the cabin, the control system of the installation has at least two, and more usually three, manually controlled members which are typically in the form of rotary knobs. Because of the number of these control members, the control panels are difficult to read, that is to say it is difficult to absorb the current state of the system at a glance, and difficult to see at a glance what adjustments to the control members need to be made if a change is to be made in the atmospheric conditions. In general, this makes the conventional controls of vehicle heating, ventilating and air conditioning systems somewhat inconvenient to use. In addition, the controls occupy quite a large amount of space, and this gives rise to problems in some vehicles, especially small vehicles intended for urban use.

SUMMARY OF THE INVENTION

One object of the invention is accordingly to provide a control device from which the disadvantages of known control devices are wholly or partly absent.

A control device for an installation, particularly an installation for heating, ventilating and/or air conditioning the cabin of a motor vehicle, comprises an electronic control module for managing at least a first, a second and a third function of the installation, each function comprising at least two different states, and a control member which is adapted in such a way that, when put into one position among a plurality of positions corresponding respectively to the functions of the installation, and when then actuated in the selected position, the control member acts on the control module to modify the state associated with the selected function.

Thus, with a control device according to the invention, it is possible to set the atmospheric parameters of the installation to their desired values using only one manual control member.

In a first configuration, firstly, the control member may be actuated by tilting action in one plane in at least one direction when in one of the selected positions, and secondly, the control module includes at least a first, a second and a third contactor which are associated respectively with each function (and therefore with each position), and which are arranged to change the selected function from an nth state, referred to as an anterior or current state, to another state which is an (n+1)th or an (n−1)th state respectively, when the control member is displaced by tilting.

In this first configuration, tilting of the control member is effected in a single direction, and each tilting displacement changes the system from a current or anterior state (as defined above) to the next following predetermined state, or to the preceding predetermined state. In this case it is preferable that the control member should include an actuating means, for example a projecting element or an arm having a finger for acting in each position on the contactor associated with the said position.

In a second configuration, firstly, the control member may be actuated by planar tilting displacement forwards or backwards when in one of the selected positions, and secondly, the control module includes at least a first, a second and a third pair of contactors associated respectively with each function (and therefore with each of the positions), each said pair of contactors being arranged to modify the state associated with the selected function when the control member is tiled forward or back, each said pair comprising a so-called forward contactor and a so-called backward contactor, which are adapted to change the selected function from an anterior nth state to, respectively, an (n+1)th state when the control member is tilted forwards, or an (n−1)th state when the control member is tilted backwards.

In this second configuration the control member can be tilted either forwards, so as to change the function associated with the selected position from a so-called current or anterior state to a predetermined following state, or backwards so as to change the function associated with the selected position from the current or anterior state to the predetermined preceding state. In that case, it is preferable that the control member should include a forward actuating means and a backward actuating means, which are adapted, respectively, to act in each position on the forward contactor and the backward contactor of the pair of contactors associated with the said position. The actuating means are preferably in the form of a projection or arm having a finger.

In a preferred embodiment, the control device includes display means connected to the control module for showing the current state of each function.

Preferably, in order to enable the display means to show the selected position, contact means are provided, which are adapted to signal to the control module the position of the control member. Thus for example, an indicator light can be located adjacent to a symbol in the display representing the selected function that corresponds to the prevailing position of the control member.

The display means may be located close to or remote from the control member. In the latter case, they may for example be fitted in the control panel close to the speedometer and revolution counter of the vehicle, in direct view of the driver.

In a preferred embodiment of the invention, the first, second and third functions are, respectively, the functions of air distribution, air mass flow control, and control of the temperature in the cabin of the vehicle, with each function preferably having at least four different possible states.

In another embodiment, the control member may be adapted to include at least one predetermined fourth position associated with a predetermined operating mode of the installation, in which the first, second and third functions are automatically put into selected respective states. Such a mode of operation is generally referred to as an automatic mode.

In yet another embodiment, the control member may have a central part which carries auxiliary actuating means adapted to act on the control module in such a way that it puts the installation into a further predetermined position associated with a further predetermined operating mode, in which the first, second and third functions are automatically put into respective selected states independent of the position of the control member.

The invention is most particularly applicable, albeit without limitation, to control members of a rotary type.

Additional features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS

Reference is first made to FIGS. 1 to 4, showing the first embodiment of the invention. The control device described is designed for the purpose of managing a heating and air conditioning installation for the cabin of a motor vehicle.

Figure 2:
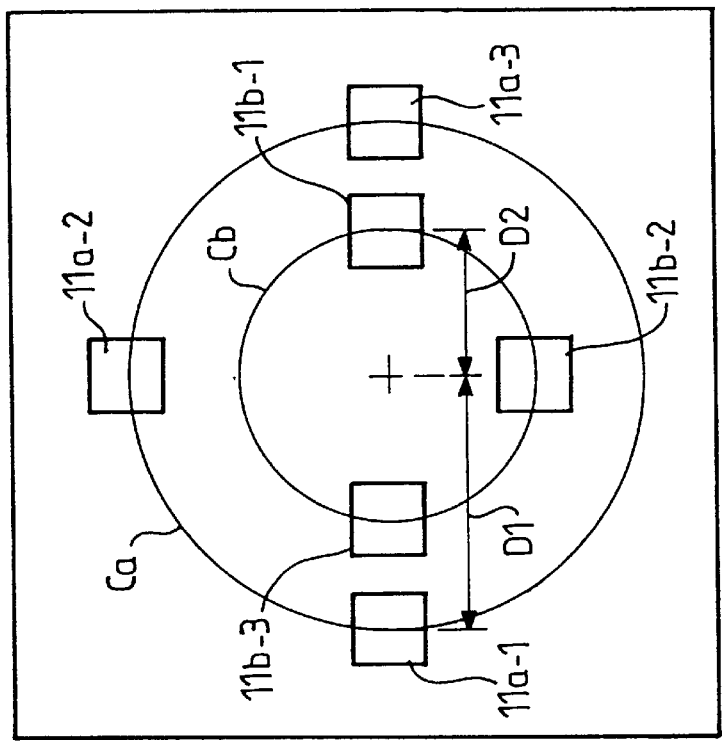
FIG. 2 is a top plan view of the same control module.
Figure 1:
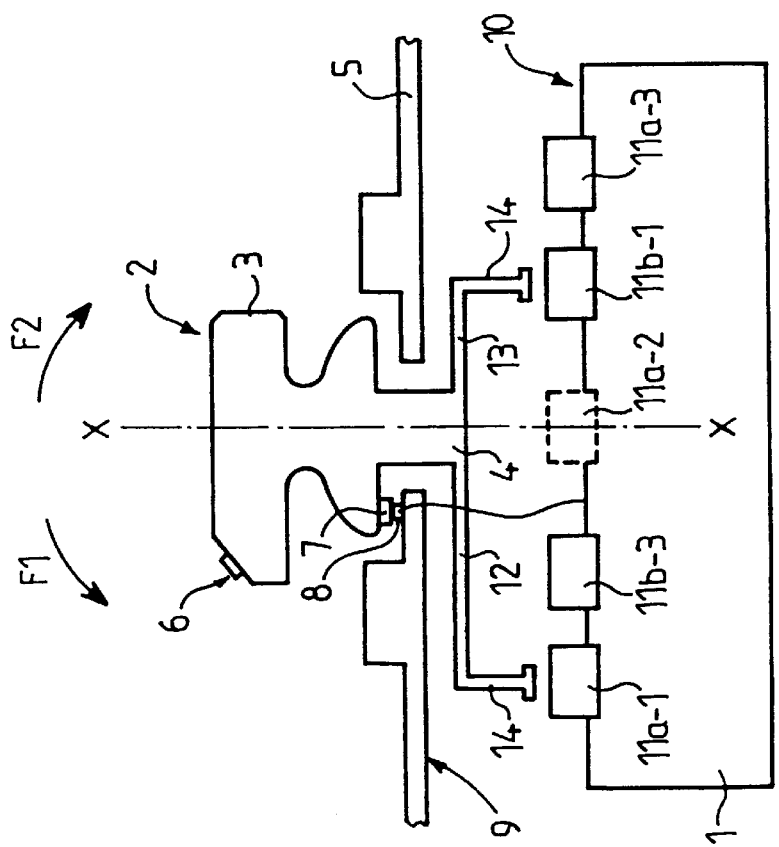
FIG. 1 is a view, in median transverse cross section, of a control device which include an electronic control module.

The control device shown in FIG. 1 consists of a control module which is connected to the various adjustable working devices of the installation, which are not shown in the drawings. Such working devices may consist of for example a blower. The control device includes a control member 2 which has an upper part 3 and a lower part 4. In this example the control member 2 is a manually operated rotary knob which is arranged in such a way that it can be rotated about an axis X—X which is substantially perpendicular to the front face 5 of a casing (the rest of which is not shown). This casing contains both the control member 2 and the control module 1, and is generally mounted within the fascia panel of the vehicle. As can be seen in FIGS. 5A to 5D, the front face 5 of the casing of the control device carries marks indicating the positions Pi in which the control knob 2 can be put, these marks being in the periphery of the annular zone of the face 5 in front of which the upper part 3 of the control knob 2 is displaceable. These marks may be made in any suitable known form, and may be applied for example adhesively or by engraving.

In addition, in the example shown in FIGS. 5A to 5D, the control member can assume three positions P1 to P3. In the first position P1, in the nine o'clock position in the Figures, the function of air distribution in the installation can be controlled. In the second position P2, in the twelve o'clock position in the Figures, the mass flow of air in the installation can be controlled. In the third position P3, in the three o'clock position in the Figures, the demand temperature, i.e. the temperature which the user requires to prevail in the cabin of the vehicle, is controlled.

In each of these positions Pi, where in this example i is 1 to 3, is therefore associated with one particular function of the installation, and each of these functions can be set in at least two different selected states. In this example, there are, for each of these functions, four or more of these different states as is illustrated in FIGS. 3, 6 and 8.

Figure 3:
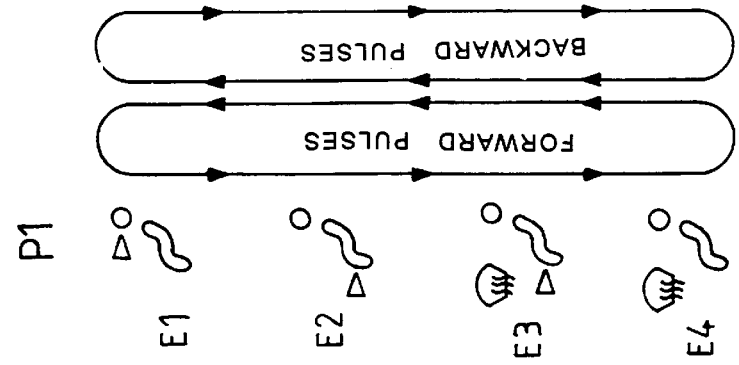
FIG. 3 is a diagram illustrating four different states of air distribution which can be permitted by the manual control member of the control device when put in a first position.
Figure 7B:
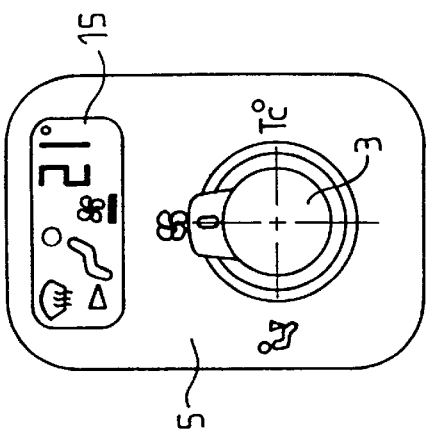
FIG. 7B is similar to FIG. 7A, but corresponds to a second one of the states in FIG. 6.
Figure 7D:
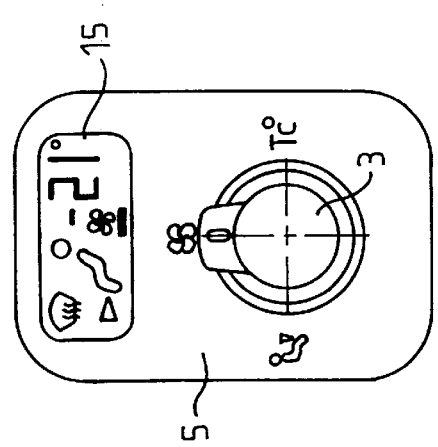
FIG. 7D is similar to FIG. 7A, but corresponds to the fourth state shown in FIG. 6.
Figure 7A:
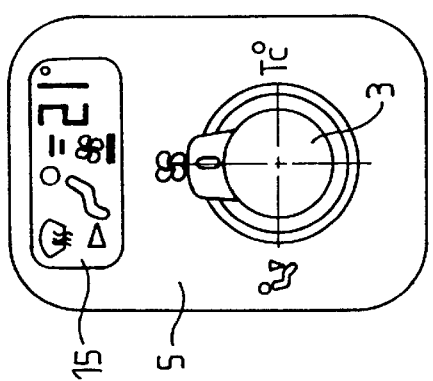
FIG. 7A is a diagram showing the front face of the control device in a first embodiment of the invention, corresponding to a first one of the states shown in FIG. 6.
Figure 7C:
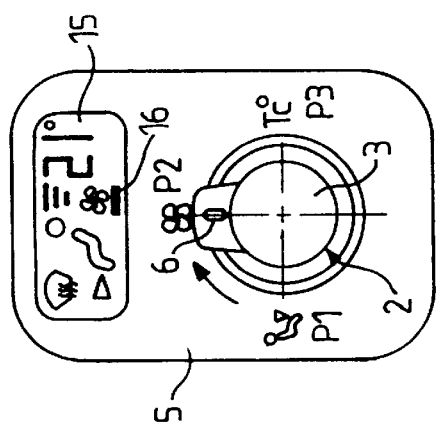
FIG. 7C is similar to FIG. 7A, but corresponds to a third one of the states shown in FIG. 6.

Thus, in the first position P1, see FIG. 3, the state E1 corresponds to distribution of the air at the level of the faces of the occupants of the front seats of the vehicle. State E2 corresponds to distribution of air to the level of the feet of these front seat occupants, while state E3 corresponds to both distribution of air at foot level and to operation of a de-icing function. Finally, the state E4 corresponds to de-icing only, without any delivery of air towards the occupants of the vehicle.

Figure 6:
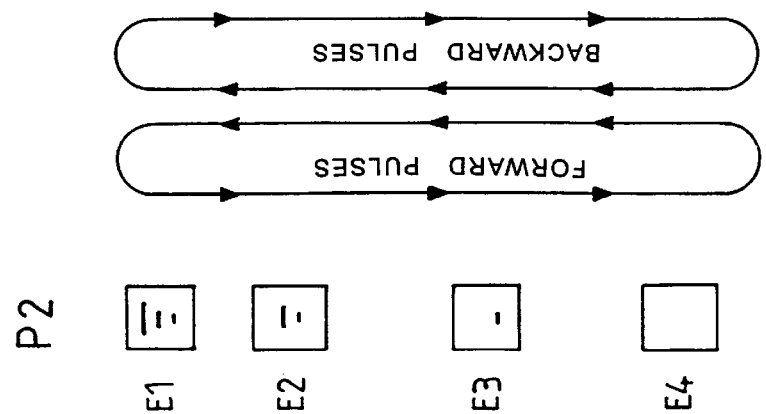
FIG. 6 is a diagram illustrating four different states of regulation of the air flow permitted by the control member when the latter is put into a second position.

Reference is now made to FIG. 6, which relates to the control knob 2 being set in the position P2. In this position, the state E1, FIG. 6, corresponds to operation of the blower at full speed, thereby giving maximum air flow. State E2 in FIG. 6 corresponds to an intermediate state of operation of the blower, i.e. at reduced speed, giving a moderate air flow, while state E3 corresponds to a minimum operating regime of the blower with minimum air flow. State E4 in FIG. 6 corresponds to the blower being out of operation, so that there is no air flow at all.

Figure 8:
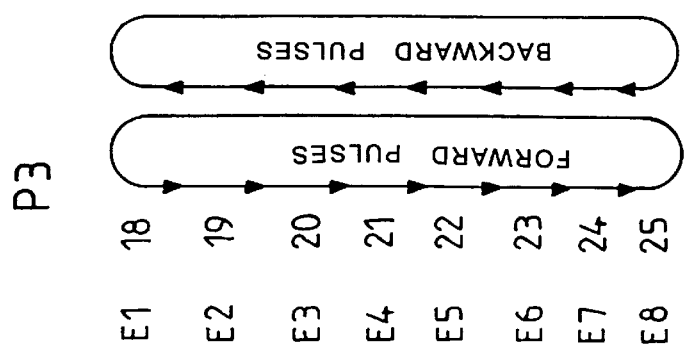
FIG. 8 is a diagram illustrating eight different states of the air temperature permitted by the control member when the latter is put into a third position.

The third position P3 of the control knob 2 gives the eight states represented in FIG. 8, in which the states, E1 to E8, represent eight possible temperatures in the cabin of the vehicle.

In general, each function, and in consequence each position Pi associated with that function, is independent, as regards the various states (E) which can be selected in that position, from the prevailing state of the other two functions corresponding to the other two positions of the control knob 2.

To pass from a given state Ei to another state Ej, where i is different from j, it is necessary first to rotate the control member 2 so as to position an index 6, carried by the upper part 3 of the control knob 2, in line with the particular function indicated on the front face 5 of the casing. The lower part 4 of the control knob 2 includes a contactor element 7 which makes contact with a conductive element 8 located on the front or upper face 5 of the casing. The conductive element 8 is connected to the control module 1, so that making of the electrical contact between the elements 7 and 8 signals to the control module that the user requires to modify the function which corresponds to the position in which the control knob 2 has been put.

Figure 4A:
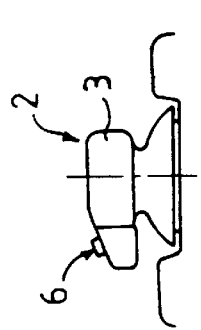
FIG. 4A is a side view showing the outer (or upper) part of the control member when it is in its rest position.

In the example shown, passage from a state Ei to a state Ej, is effected by displacing the upper part 3 of the control knob 2 in a plane containing the axis X—X, that is to say parallel to the plane of FIGS. 1 and 4. In this example this displacement takes the form of tilting the knob 2 either forwards (as indicated by the arrow F1 in FIG. 1) or backwards (as indicated by the arrow F2 in FIG. 1). These forward and backward tilting movements are effected with reference to the index 6 and also with reference to the mark that represents the corresponding function of the installation on the front face 5 of the casing.

In this embodiment in which the control member 2 can be tilted both forwards and backwards, it is possible to pass from a state n to a state n+1 by forward tilting, or from a state n to a state n-1 by backward tilting. It will however be evident that, in a simplified version, it is possible to envisage a change of state in one direction only, for example by forward tilting only, thereby changing a state n to a state n+1; or alternatively, by rearward tilting which involves only a change of state from a state n to a state n-1, or vice versa.

In order to signal to the control module 1 that the state Ei of the function corresponding to the selected position of the control knob is to be modified, the control module 1 has contactors, for example on an upper face 10 of the module. In the example shown in FIGS. 1 and 2, one pair of contactors 11-1 to 11-3 is associated with each of the three positions Pi of the control knob 2. Each of these pairs comprises a first contactor 11a-i and a second contactor 11b-i. In the example shown, the contactors denoted by a reference index having the same lower case letter suffix (a or b) are spaced apart on a common circle. Thus, as is clearly shown in FIG. 2, the contactors having the suffix "a" are located on a first or outer pitch circle Ca, while the contactors 11 having the suffix "b" are on a second pitch circle Cb of smaller radius than the circle Ca and coaxial with the latter. The radius of the circle Ca is equal to the distance D1 in FIG. 2, while the radius of the circle Cb is equal to a distance D2 smaller than D1.

In order to enable the control member 2, when it is in one or other of its tilted positions, to act on the contactors 11 of the control module 1, the control member 2 has in its lower part 4 a first arm 12 and a second arm 13, each of these arms being substantially parallel to the associated contactors 11, and being terminated by an end portion 14 which is substantially at right angles to the main part of the arm 12 or 13 and which extends towards the associated contactors 11.

The distance separating the axis of rotation X—X from the end portion 14 of the first arm 12 is substantially equal to the radius D1, while the distance separating the axis of rotation X—X from the end portion 14 of the second arm 13 is substantially equal to the radius D2. Thus, when the control knob 2 is tilted forward in accordance with the arrow F1, into the position shown in FIG. 4C, the end portion 14 of the first arm 12 exerts a pressure on the associated contactor 11a-i, where i indicates one of the three positions 1 to 3 corresponding to the position in which the control member 2 is set at the time.

Figure 4B:
FIG. 4B is a view similar to FIG. 4A but showing the control member in a backward position.
Figure 4C:
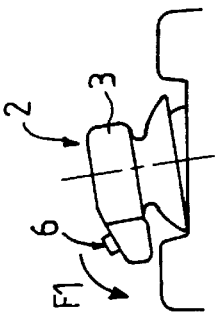
FIG. 4C is a view similar to FIG. 4A but showing the control member in a forward position.

Similarly, when the control member 2 is tilted to the rear as indicated by the arrow F2, into the position shown in FIG. 4B, the end portion 14 of the second arm 13 exerts a pressure on the associated contactor 11b-i.

The contactors 11 are preferably of the so-called impulse type, that is to say each time they are subjected to an applied pressure, they produce a pulse which modifies the state of the circuits with which they are respectively connected in the control module 1. The control module is arranged so as, in response to this pulse, to modify the setting of the installation concerned in the required way.

The various diagrams in FIGS. 3, 6 and 8, to which reference is now made in particular, indicate so-called forward pulses and backward pulses. With the forward pulses, produced with the control knob 2 in its forward position shown in FIG. 4C, the system passes from state E1 to state E2 on the first pulse, from E2 to E3 on the second pulse, and so on. In the example shown, a fourth forward pulse can either return the system to the state E1, or revert to state E3. Similarly, with the knob 2 in its backward position, FIG. 4B, the pulses are backward pulses so that a first pulse changes the state from E4 to E3, the second pulse changes the state from E3 to E2, and so on. In this configuration a fourth pulse therefore changes the state either from E1 to E4 or from E1 to E2.

In order to indicate to the user the precise state of the installation at any given time, the control device includes display means 15 (see FIGS. 5, 7 and 9), controlled by the control module 1. As shown in these Figures, the display 15 can conveniently be located close to the control member 2 on the front face 5 of the casing of the control device.

Figure 10:
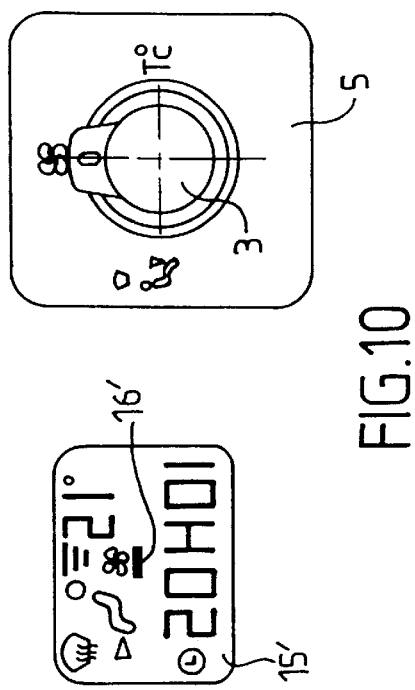
FIG. 10 shows another version of the control device in accordance with the invention, in which the setting means and the control member are located in different places.

In another version, shown in FIG. 10, the display (indicated here at 15') may be separate from the casing of the control device, and therefore located away from the front face 5 of the latter. In that case, the display may be fitted close to the speedometer and revolution counter of the vehicle. The display 15' may for example include a digital clock for the convenience of the occupants. This version has the advantage of providing centralised information to the driver, so that the latter can have direct access to all relevant information without turning his head.

Figure 9A:
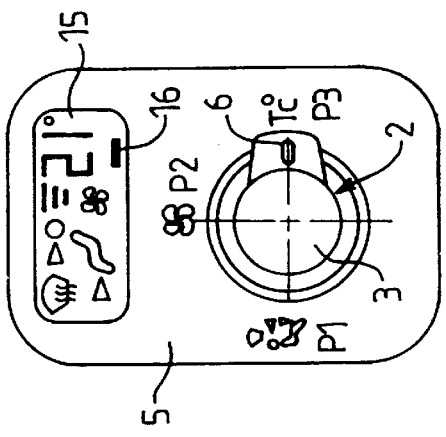
FIGS. 9A and 9B show the front face of the control member in a second embodiment of the invention, showing respectively two of the eight states represented in FIG. 8.
Figure 9B:
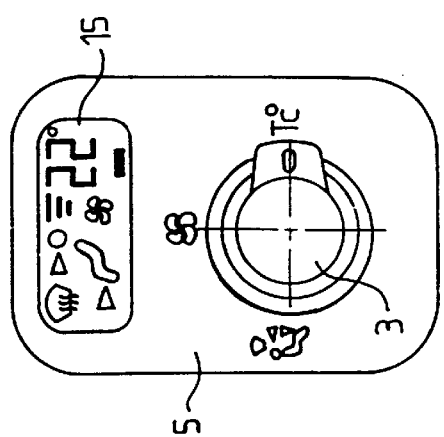

FIGS. 5A to 5D show the four states E1 to E4 which can be adopted by the installation when the control member 2 is put in its first position P1 corresponding to the air distribution function. Similarly, FIGS. 7A to 7D shown the four states E1 to E4 of the installation when the control knob 2 is in its second position P2; and FIGS. 9A and 9B show the states E4 and E5 of the installation when the control member 2 is in its third position P3.

Given that these three positions P1 to P3 are independent from each other, modification of the state of the system in any one of these positions does not lead to any change of state for the other two positions. In consequence, to enable the user to see, or effect, the function just modified, or the function which is currently being modified, a warning light 16 (FIGS. 5, 7 and 9) or 16' (FIG. 10) is incorporated in the display 15 or 15'. This warning light appears below the function associated with the current position of the control knob 2. Thus for example, in FIG. 5A, the warning light 16 is under the symbol in the display that indicates the air distribution function, which indicates that the control knob 2 is in its first position P1.

Figure 5B:
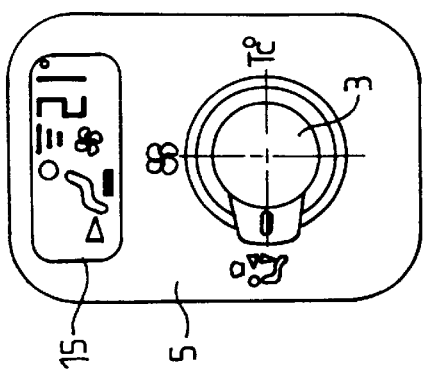
FIG. 5B is similar to FIG. 5A, but corresponds to a second one of the states in FIG. 3.
Figure 5D:
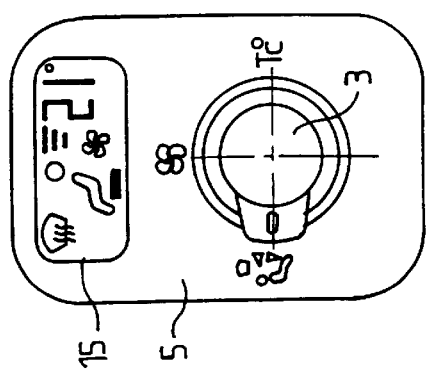
FIG. 5D is again similar to FIG. 5A, but corresponds to the fourth state illustrated in FIG. 3.
Figure 5A:
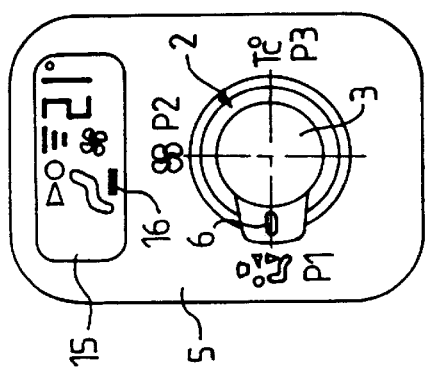
FIG. 5A shows the front face of the control device in first embodiment of the invention, in first of the four states shown in FIG. 3.
Figure 5C:
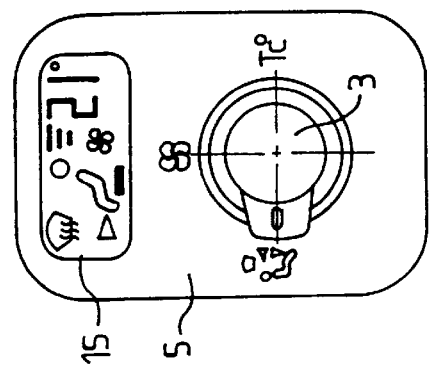
FIG. 5C is similar to FIG. 5A, but corresponds to a third one of the states in FIG. 3.

By way of example and with reference to FIG. 5D, the control member 2 being in its first position P1, the state indicated by the display 15 is the fourth state E4 of the air distribution function associated with the position P1. In this case, as explained above, this state is that of de-icing alone. Air flow is at its maximum (state E1 in FIG. 6), while cabin temperature is at 21° C., corresponding to state E4 in FIG. 8.

Figure 11:
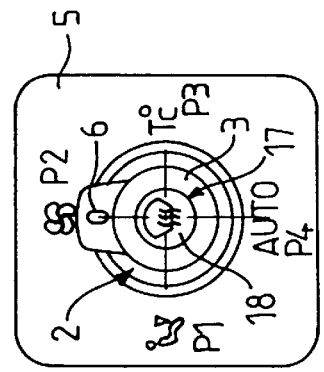
FIG. 11 shows a more sophisticated embodiment of the control device.

The invention is not limited to devices in which the control member is capable of assuming only three positions. In this connection, a fourth position or even more positions may be provided, with each position corresponding to two predetermined operating modes in which the user has no need to manage the various states of the three main functions effected by positions P1 to P3. An example of such an arrangement is shown in FIG. 11, in which there is a fourth position P4, or AUTO position, of the control knob 2. In the arrangement shown in FIG. 11, the control member also includes a central part 17 which incorporates a further manual actuating member. This latter may for example be a button of the "push—push" type, which enables the user to put the installation directly into the de-icing mode. In practice this corresponds to a fifth possible position of the control knob 2.

The invention is not limited to the embodiments described above, but embraces all possible developments within the competence of the ordinary person skilled in this particular technical field, within the scope of the Claims of this Application. Thus for example the form of the lower part of the control member may be considerably different from that shown, according to the locations chosen for the contactors of the control module.

Similarly, the invention is not limited to control devices in which the manual control member is a rotary component such as the knob 2 in the drawings. It could just as well, for example, be a lever or other member which is displaceable in for example straight line movement, but which has the same type of tilting actuation as that described above. It will be clear that in that case, the various contactors 11 can be aligned parallel to the line along which the manual control member is displaced.

What is claimed is:

1. A control device for an installation comprising:
   an electronic control module for managing a plurality of functions of the installation, each said function being adjustable between a plurality of different states;
   a rotatable control member for selective displacement between a plurality of rotational positions and for further displacement between a plurality of subpositions within each said rotational position, each said rotational position corresponding to one of the plurality of functions; and
   a plurality of actuating members carried by the control member for engagement with the control module on said further displacement to one of said plurality of subpositions of the control member within said rotational position to cause the control module to change the state of the function of the installation associated with said rotational position of the control member.

2. A control device according to claim 1, wherein said further displacement of the control member involves tilting movement in at least one direction while the control member is in one of said positions.

3. A control device according to claim 2, wherein an actuating member is disposed in relation to said contactors such that in each said position of the control member, the actuating member acts on a said contactor associated with said position.

4. A control device according to claim 1, wherein said further displacement of the control member is a selective planar tilting movement in a forward direction or a backward direction while the control member is in one of said positions, and each pair of said contactors associated with one of the functions of the installation to modify the state of the corresponding function of the installation from an anterior nth state to an (n+1)th state when the control member is tilted in one of said forward and backward directions, or to an (n−1)th state when the control member is tilted in the other one of said directions.

5. A control device according to claim 4, wherein each of the actuating members comprises a forward actuating member and a backward actuating member, said forward actuating member and backward actuating member acting on a forward contactor and a backward contactor associated with said position, respectively.

6. A control device according to claim 1, further including a display device connected to the control module for displaying the current state of each of the functions of the installation.

7. A control device according to claim 1, further including contact device for signalling to the control module said position of the control member.

8. A control device according to claim 6, wherein the display device is located close to the control member.

9. A control device according to claim 6, wherein the display device is located remote from the control member.

10. A control device according to claim 1, wherein the installation is a heating and ventilating installation for a motor vehicle, and the functions of the installation are air distribution, air mass flow, and air temperature.

11. A control device according to claim 1, wherein each function has at least four different states.

12. A control device according to claim 1, further comprising at least one predetermined position of the control member, associated with a predetermined operating mode of the installation, wherein the functions of the installation are automatically put in respective selected said states.

13. A control device according to claim 1, wherein the control member has a central part, and auxiliary actuating means carried in said central part associated with the control module to act on the control module in such way as to put the installation into a further predetermined position associated with a predetermined further operating mode in which the functions of the installation are automatically put into selected states independent of the position of the control member.

14. An apparatus comprising:
   an electronic control module for managing a plurality of functions of an installation, each function having a plurality of different states, said control module having a plurality of pairs of contactors, each pair of contactors associated with one of the functions and including a forward contactor and a backward contactor;

a rotatable control member adjustable between a plurality of rotational positions, each said rotational position corresponding to one of the functions of the installation, wherein the control member comprises an upper part and a lower part, the upper part including an index for effecting displacement of the control member between a plurality of subpositions within each said rotational position, the lower part including a first and second arm each having an end portion; and a display device controlled by the control module for displaying the selected state of each of the functions of the installation.

15. An apparatus according to claim 14, wherein the lower part of the control member further comprises a contactor element which makes contact with a conductive element connected to the electronic control module when a change of position of the control member takes place.

16. An apparatus according to claim 14, wherein the displacement of the control member is a tilting movement in either a forward or backward direction when the control member is in one of said positions, said tilting movement leading to a change of state from a state n to either a (n+1)th state or a (n−1)th state depending on the direction of movement.

17. An apparatus according to claim 14, wherein the display device further comprises a warning light appearing below the function associated with the selected position of the control member.

* * * * *